July 11, 1933. W. S. WATTS 1,917,864
BRAKE
Filed Nov. 22, 1930

INVENTOR.
WILLIAM S. WATTS
BY
M.W. McConkey
ATTORNEY

Patented July 11, 1933

1,917,864

UNITED STATES PATENT OFFICE

WILLIAM S. WATTS, OF SOUTH BEND, INDIANA, ASSIGNOR TO BENDIX BRAKE COMPANY, OF SOUTH BEND, INDIANA, A CORPORATION OF ILLINOIS

BRAKE

Application filed November 22, 1930. Serial No. 497,390.

This invention relates to brakes and is illustrated as embodied in an internal expanding automobile brake of the shiftable-anchorage type. An object of the invention is to provide simple operating means for a pair of levers or other members which directly apply the brake shoes or their equivalents, for example by extending a Bowden conduit through the backing plate of the brake and connecting it to one of the levers inside of the brake chamber formed by the drum and the backing plate, while a flexible force-transmitting medium such as a tension cable arranged in the conduit is connected to the other brake-applying member. By this arrangement the cable operates one of the brake-applying members directly, while reaction on the conduit due to tension on the cable operates the other of the brake-applying members.

Another feature of the invention relates to the means for connecting the above-described cable and conduit or equivalent means to the brake-applying levers, for example by connecting one of them to a slide member which is pivoted to one lever and slidably connected to the other and connecting the other of them to a fitting secured to the end of the other lever.

Figure 1:
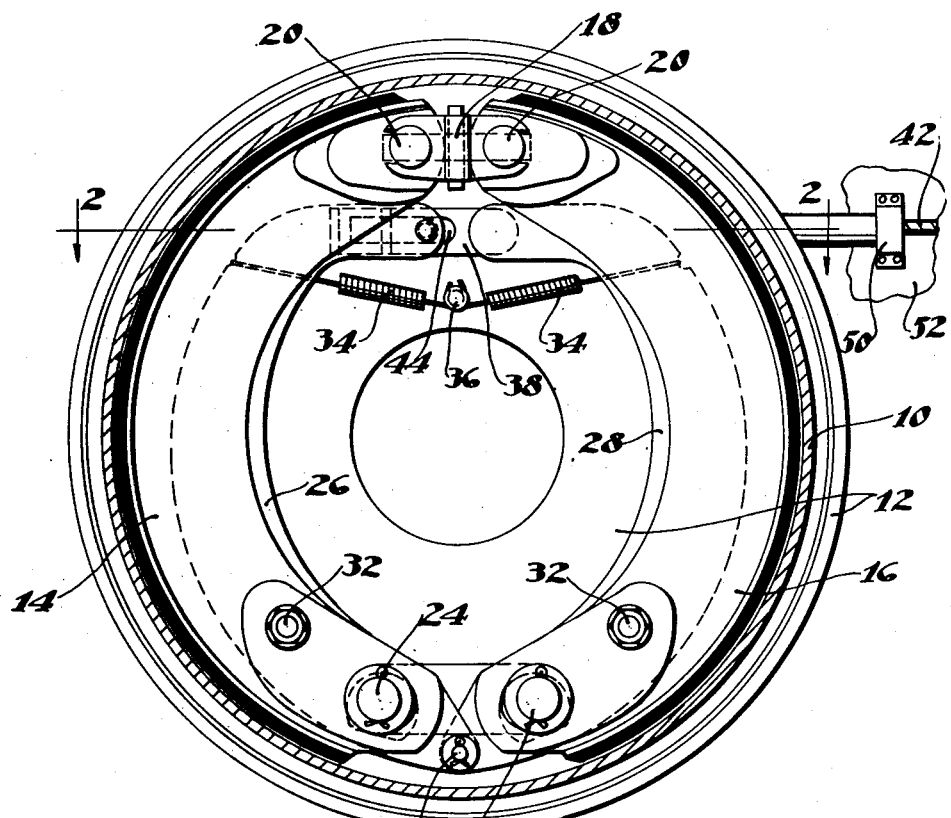
Figure 2:
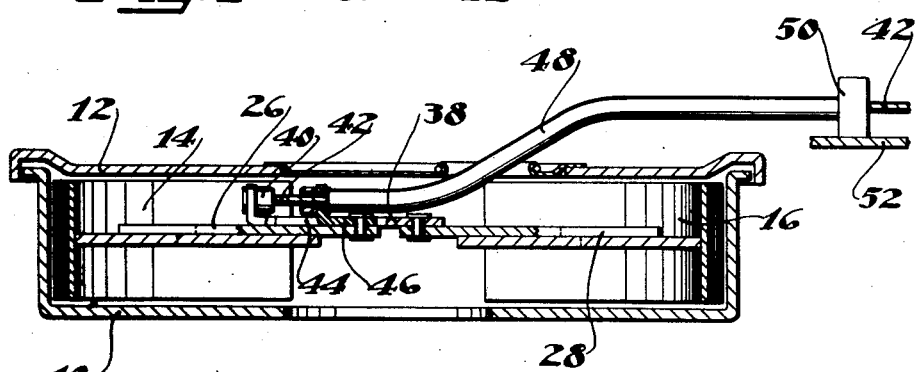

The above and other objects and features of the invention, including various novel and desirable details of construction, will be apparent from the following description of one illustrative embodiment shown in the accompanying drawing, in which:

Figure 1 is a vertical section through the brake just inside the head of the brake drum and showing the brake shoes in side elevation; and Figure 2 is a section on the line 2—2 of Figure 1 showing the brake-applying means.

The above-described drawing illustrates my invention as embodied in a brake of the type fully described in application No. 495,945, filed November 15, 1930, by Adolph Rosner and assigned to Bendix Brake Company (Bendix file M7055), the invention of the present application being junior to the invention of the above-identified Rosner application.

This particular brake is of the shiftable-anchorage type and includes a rotatable drum 10, at the open side of which is a support such as a backing plate 12, the drum and the backing plate defining between them a brake chamber containing the friction means of the brake, preferably a pair of shoes 14 and 16 connected by means such as an adjustable joint 18 mounted on pivots 20 carried by the upper ends of the shoes. If the drum is turning clockwise when the brake is applied, the shoe 16 anchors on means such as a fixed post 22 carried by the backing plate and extending through an elongated opening in the web of the shoe. If the drum is turning counterclockwise when the brake is applied, the shoe 14 anchors in a similar manner on a fixed post 24 also carried by the backing plate 12 and which extends through an elongated opening in the web of the shoe 14.

The brake is applied by members such as levers 26 and 28 connected by a floating fulcrum or pivot 30 at their lower ends and bowed upwardly away from each other to leave an unobstructed space in the center of the brake for the passage of an axle or front wheel knuckle. The levers 26 and 28 are connected respectively to the shoes 14 and 16 by means such as pivots 32. The upper ends of the levers 26 and 28 are provided with return springs 34 tensioned between the levers and a fixed post 36 carried by the backing plate. One of the springs 34 may, if desired, be made stronger than the other so that the one lever will move its shoe against the brake drum before the other one is fully operated so that the friction of the drum against the shoe part which first engages it will predetermine the anchorage on one or the other of the posts 22 or 24 so that there will not be a shifting of the friction means under load after the brake is fully applied.

The upper ends of the levers are connected by means shown as including a thrust link 38 pivotally connected to the upper end of the lever 28 and which is turned toward the backing plate at right angles at the end opposite the lever to receive a fitting 40 on the end of a flexible tension cable 42, or some equivalent force-transmitting medium operatively connected to the usual brake hookup. The thrust link 38 is formed with a slot 44 slidably embracing and guiding a right-angle stamping or thrust fitting 46 pivoted to the end of the lever 26 and operatively engaged by one end of a flexible Bowden conduit 48 containing the cable 42 and the opposite end of which is fixedly secured to a fitting 50 carried by the chassis frame 52.

It will be seen that tension on the cable 42 operates through the link 44 to operate the lever 28, while the tension on the cable also causes the conduit 48 to react against the fitting 46 to operate the lever 26. This spreads the levers 26 and 28 apart to apply the brake as described above.

While one illustrative embodiment of the invention has been described in detail, it is not my intention to limit its scope to that particular embodiment or otherwise than by the terms of the appended claims.

I claim:

1. A brake comprising a drum and a backing plate forming a brake chamber between them and having friction means and two operating members therefor pivoted on and carried by the friction means and arranged within said brake chamber, in combination with a conduit passing through the backing plate and operatively connected to one of said members, and force-transmitting means in the conduit acting on the other of said members.

2. A brake comprising a drum and a backing plate forming a brake chamber between them and having friction means and two operating members therefor pivoted on and carried by the friction means and arranged within said brake chamber, in combination with a flexible conduit passing through the backing plate and operatively connected to one of said members and reacting thereagainst, and a flexible tension element in the conduit acting on the other of said members.

3. Brake-applying means comprising a pair of levers, a member pivoted to one lever and slidably connected to the other lever, and flexible conduit means and force-transmitting means therein, one of said means being operatively connected to said member and the other of said means being operatively connected to said other lever.

4. Brake-applying means comprising a pair of levers, a member pivoted to one lever and slidably connected to the other lever, another member fixedly secured to said other lever, flexible conduit means operatively connected to one of said members, and force-transmitting means in the conduit operatively connected to the other of said members.

5. Brake-applying means comprising a pair of levers, one of which is provided with a fitting at its end and the other of which is provided at its end with a slotted link slidably embracing and guiding said fitting.

6. Brake-applying means comprising a pair of levers, one of which is provided with a fitting at its end and the other of which is provided at its end with a slotted link slidably embracing and guiding said fitting, together with operating elements acting respectively on the fitting and on the link.

In testimony whereof, I have hereunto signed my name.

WILLIAM S. WATTS.